Figure 1:
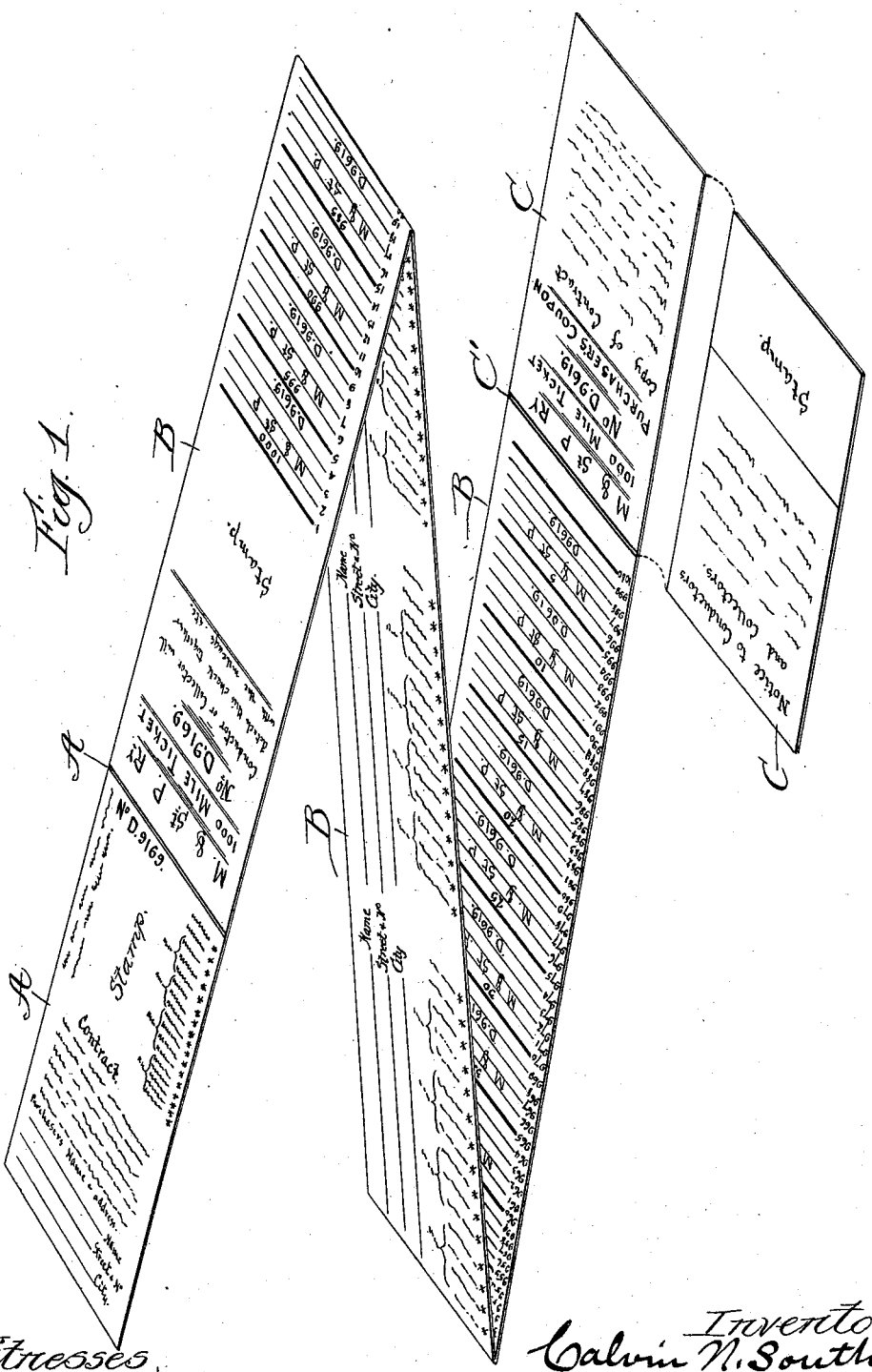

(No Model.) 2 Sheets—Sheet 1.

C. N. SOUTHER.
PASSAGE TICKET.

No. 590,651. Patented Sept. 28, 1897.

Witnesses
Inventor
Calvin N. Souther
By Cyrus Kehr
Atty.

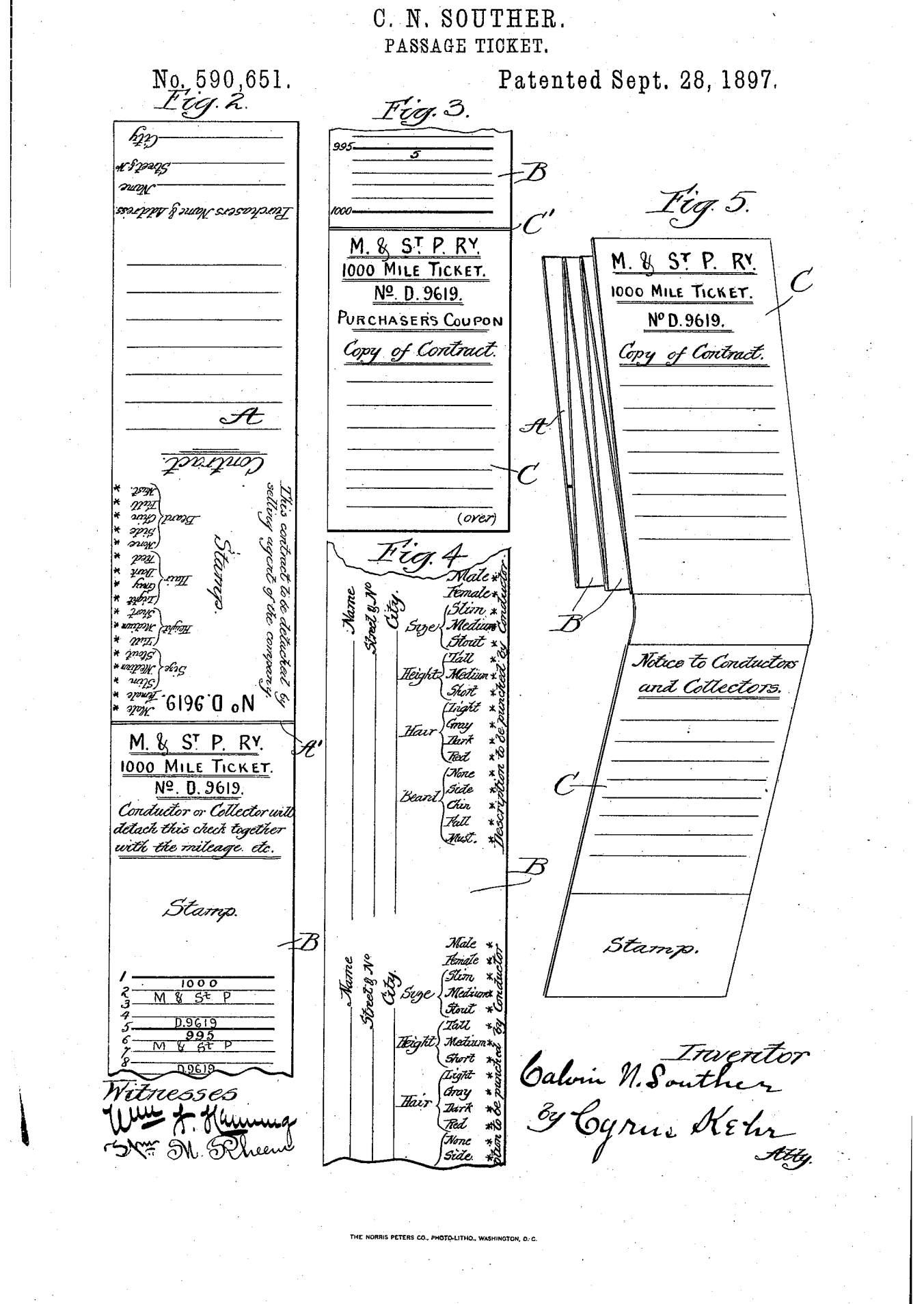

(No Model.) 2 Sheets—Sheet 2.

C. N. SOUTHER.
PASSAGE TICKET.

No. 590,651. Patented Sept. 28, 1897.

UNITED STATES PATENT OFFICE.

CALVIN N. SOUTHER, OF CHICAGO, ILLINOIS.

PASSAGE-TICKET.

SPECIFICATION forming part of Letters Patent No. 590,651, dated September 28, 1897.

Application filed May 8, 1896. Serial No. 590,646. (No model.)

*To all whom it may concern:*

Be it known that I, CALVIN N. SOUTHER, a citizen of the United States, residing at Chicago, in the county of Cook and State of Illinois, have invented certain new and useful Improvements in Passage-Tickets; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to such passage-tickets as are used for travel on railways, boats, coach-lines, and for admission to places of amusement and entertainment.

The invention is applicable particularly to what are called mileage transportation-tickets and single and round trip local and coupon railway and boat tickets which are to be used only by the purchaser.

The object of the invention is to produce such a ticket in such form as will make easy the detection of its use by a person or persons other than the purchaser.

The mileage-tickets at present in general use by the railroads in this country comprise a mileage-slip and a cover bearing a contract and the signature and descriptive identification of the purchaser. The ticket is sold with the provision that a rebate shall be paid on presentation of the cover after the mileage has been used. A special form of mileage-tickets called the "advertising" or "editorial" mileage-ticket is in use. This does not provide for a rebate, but it is issued under a contract which provides for the forfeiture of the contract and the surrender of the ticket if the latter is used by any person other than the one to whom it was issued. There are also various forms of local and coupon tickets, intended to be used only by the purchaser, and which bear his signature and description when delivered to him. In using these tickets the identity of the purchaser and the holder is sought to be determined and decided by each conductor or collector to whom the ticket is presented, and if he decides that the ticket is presented by some person other than the purchaser he takes up the ticket and delivers it to the ticket auditor of the railway company, the unused portion of the ticket and the rebate, if there be one, being both forfeited. This exercise of judicial function on the part of the conductor is annoying and embarrassing to him and to the rightful user of the ticket. Quarrels and litigation frequently ensue.

When my ticket is delivered to the purchaser it does not bear his signature nor his description, these being on the stub or coupon detached by the selling agent. In the use of my ticket the conductor accepts any signature that the user may write upon the ticket and notes the personal description of such user on the part of the ticket which is taken for that passage, making no inquiry whatever as to whether the holder of the ticket is the person who purchased the same. Each detached portion of the ticket is filed with the auditor or other person having charge of the agent's stub or coupon detached from the ticket at the time of sale and bearing the signature and other identification. A comparison of signatures and memoranda of personal appearance is made by the auditor and he determines whether each trip was made by the purchaser of the ticket. No name appearing on the ticket being used, the wrongful holder will probably not know the name of the purchaser, and if he does know it he may not be able to spell it correctly, or, in the absence of a signature, may not be able to imitate the writing. If the auditor decides that the ticket is being used or was used by a person or persons other than the purchaser, the ticket is listed for forfeiture, the rebate declared forfeited, or the purchaser called to account under his contract. It being thus made substantially impossible to have persons other than the purchaser use these tickets without jeopardizing the rebate, the ticket, or the purchase contract, wrongful traffic in such tickets is deprived of its profit.

In the accompanying drawings, Figure 1 is a perspective view of a ticket embodying my improvement. Figs. 2 and 3 are views of the front of such ticket, Fig. 2 representing the upper part and Fig. 3 the lower part. Fig. 4 is a view of a portion of the back of said ticket. Fig. 5 is a perspective view of such a ticket, the purchaser's coupon being in the form of the covers of a book and the remainder of the book being attached to one of said covers like a long leaf.

In said drawings, A is the agent's coupon. B is the passage portion of the ticket. This may represent actual mileage, or a round trip between two points, or a single trip between two points extending over several divisions of the same railroad or over several distinct roads, so that the ticket passes under the inspection of different conductors, or it may represent admission to places of amusement or entertainment.

C is the purchaser's coupon, which is presented for the collection of the stipulated rebate, if there be one, after the ticket has been used. In Figs. 1, 2, and 3 the three parts of the ticket are joined as a continuous slip, the agent's coupon A being separable from the part B at A' and the purchaser's coupon C being separable from the part B at C'. It is to be noted that the relation of these three parts may be varied without departing from the spirit of my invention. For example, the agent's coupon A might be attached to the purchaser's coupon C and separable from the latter. Furthermore, the purchaser's coupon may be in the form of the covers of a book, as shown in Fig. 5, the remainder of the ticket being arranged to fold within said covers. The part B is to remain attached to the part C until all of the part B has been used. It is to be noted, further, that it is not essential that the agent's coupon A be actually attached to the part B or the coupon C. Though not so convenient it will answer the same purpose if the coupon A merely accompanies the parts B and C when the ticket is printed and delivered to the railway company for use. In any form it is to be regarded as a part of the ticket. Said agent's coupon is to bear a number or other designation, as "No. D 9169," which is also placed upon the part B and upon the purchaser's coupon C, to the end that the coupons and the parts of the portion C may be readily assembled after the ticket has been used. For further identification each of the three parts of the ticket should be stamped by the selling agent with the same stamp at, for example, the places marked "Stamp" in the drawings. The agent's coupon A should also bear blanks or other means for readily noting a general description of the purchaser of the ticket. These may be the words "Male," "Female," "Slim," "Medium," &c. (Shown at the left-hand portion of Fig. 2.) The agent who sells the ticket punches or marks the words indicating the personal appearance of the purchaser. Upon the same coupon is placed a contract specifying the conditions under which the ticket is sold, one of these conditions being that a rebate shall be paid to the purchaser upon presentation of the rebate-coupon after the ticket has been used, provided it appears that the ticket has been used only by the purchaser. The purchaser signs this contract and preferably places upon it also his place of business or residence, including street, number, and city. The selling agent then stamps this coupon, the part B, and the purchaser's coupon. Then he detaches the agent's coupon and delivers the remainder of the ticket to the purchaser. The part B may have printed upon it any of the ordinary mileage forms or forms for travel by divisions of roads or different roads or round trip or admissions. It should also be provided at intervals with devices for noting the personal description, as already mentioned concerning the agent's coupon. It should also be provided at intervals with blanks for the signature of the user of the ticket, together with his street and number and city; but these blanks and description are not filled out when the ticket is sold.

The purchaser's coupon may have in addition to the number or other designation of the ticket and the stamp of the selling agent a copy of the contract appearing upon the agent's coupon, but this copy of said contract is not to be signed and the ticket is preferably printed without blank space below said copy. Instead of a full copy of said contract there may be merely a summary of said contract or a statement to the effect that the purchaser's coupon entitles the bearer to a rebate under the terms of the contract bearing even date and number with such purchaser's coupon. All of this matter may be upon one side of the coupon C, or a portion may be on one side and the remainder on the other side, as indicated in Fig. 1. Said coupon may also bear directions to the train conductors and collectors.

As already indicated, when the ticket is presented for use it bears neither the personal description, the name, nor the signature of the purchaser. The conductor or collector asks no questions about the identity of the person presenting the ticket. He merely asks said person to write his name and preferably street and number and city upon the portion of the ticket to be detached for the current trip or admission. The conductor or collector then notes the personal appearance of said user upon the portion of the ticket to be detached. He then returns the ticket to the user, still bearing no identification, no name, and no signature. The next conductor or collector requires the signature of the holder of the ticket and notes his personal appearance on the part of the ticket which he detaches. The parts thus detached from time to time are forwarded to the auditor or other person who has charge of the tickets. These parts are filed away with the corresponding agent's coupon. A comparison by the ticket auditor of descriptions, names, signatures, street-numbers, and names of cities will indicate whether the ticket is being or was always used by the purchaser.

It will be observed that a person wrongfully holding the ticket will seldom actually know the name of the purchaser or his personal appearance, and if he should know the name he will not have the signature before him for counterfeiting and he may fail in correctly spelling and in giving the correct street and number and the name of the city. The wrongful holder of such a ticket will find it extremely difficult to sell such a ticket to a third party, because a third party cannot be positively assured of the signature and other writing which he must provide and he cannot be positively assured that his personal description will fit the personal description of the original purchaser. If he is told that his personal description will fit that of the purchaser and is told what writing he must supply, he must accept these statements as a matter of confidence if he accepts them at all. As already indicated, the tickets now in use carry with them the purchaser's personal description and signature, so that a third party buying from a wrongful holder can see whether he fits the personal description and whether he can probably counterfeit the signature. It is thought that these obstacles in the way of wrongful traffic in these tickets will make such traffic so difficult as to practically abate it. At the same time all persons making an honest purchase of these tickets for their own use will be better accommodated than heretofore, for they will never be drawn into controversies with conductors and collectors and they have the assurance that they can readily collect any stipulated rebate after the ticket has been used.

I claim as my invention—

1. A passage-ticket consisting of an agent's coupon bearing a contract, a part, B, representing passage, and a purchaser's coupon, each of said parts bearing the same number and the agent's coupon and the part, B, having space for denoting identification, substantially as described.

2. A passage-ticket consisting of an agent's coupon bearing a contract, a part, B, representing passage, and a purchaser's coupon, each of said three parts bearing the same number and the agent's coupon and part, B, having space for signature, substantially as described.

3. A passage-ticket consisting of an agent's coupon, a part, B, representing passage, and a purchaser's coupon, each of said three parts bearing the same number, and the agent's coupon and the part, B, having provision for signatures and for denoting personal appearance, substantially as described.

4. A passage-ticket consisting of an agent's coupon, a part, B, representing passage, and a purchaser's coupon, the agent's coupon bearing a contract and said coupon and the part, B, having provision for signature, designation of residence or place of business and personal appearance, substantially as described.

5. A passage-ticket consisting of an agent's coupon, a part, B, representing passage, and a book-form purchaser's coupon, the agent's coupon bearing a contract and said coupon and the part, B, having provision for signatures and for denoting personal appearance, substantially as described.

6. A passage-ticket consisting of an agent's coupon, a part, B, representing passage, and a purchaser's coupon, the agent's coupon bearing a contract and said coupon and the part, B, having provision for signatures and for denoting personal appearance, and the agent's coupon, the part, B, and the purchaser's coupon having each the same number or other designation to facilitate the assemblage of these parts when separated, substantially as described.

7. A passage-ticket consisting of an agent's coupon, a part, B, representing passage, and a purchaser's coupon, the agent's coupon bearing a contract and said coupon and the part, B, having provision for signature, designation of residence or place of business, and personal appearance, and the agent's coupon, the part, B, and the purchaser's coupon having each the same number or other designation to facilitate the assemblage of these parts when separated, substantially as described.

In testimony whereof I affix my signature, in presence of two witnesses, this 5th day of May, in the year 1896.

CALVIN N. SOUTHER.

Witnesses:
AMBROSE RISDON,
CYRUS KEHR.